(12) United States Patent
Lim

(10) Patent No.: US 7,782,435 B2
(45) Date of Patent: Aug. 24, 2010

(54) LIQUID CRYSTAL DISPLAY PANEL AND METHOD FOR MANUFACTURING THE SAME

(75) Inventor: Byoung Ho Lim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 133 days.

(21) Appl. No.: 12/005,632

(22) Filed: Dec. 28, 2007

(65) Prior Publication Data
US 2008/0266479 A1      Oct. 30, 2008

(30) Foreign Application Priority Data
Apr. 30, 2007   (KR) .................. 10-2007-0042152

(51) Int. Cl.
    *G02F 1/1343*   (2006.01)
(52) U.S. Cl. .................. 349/141; 349/187; 349/46
(58) Field of Classification Search .................. None
    See application file for complete search history.

(56) References Cited

U.S. PATENT DOCUMENTS

| | | | |
|---|---|---|---|
| 6,449,026 B1 * | 9/2002 | Min et al. .................. 349/141 |
| 7,522,244 B2 * | 4/2009 | Lee .................. 349/141 |
| 7,561,235 B2 * | 7/2009 | Ono .................. 349/141 |
| 7,616,284 B2 * | 11/2009 | Ahn et al. .................. 349/149 |
| 2007/0153203 A1 * | 7/2007 | Kim et al. .................. 349/141 |
| 2008/0002126 A1 * | 1/2008 | Lim et al. .................. 349/141 |

* cited by examiner

*Primary Examiner*—David Nelms
*Assistant Examiner*—Thanh-Nhan P Nguyen
(74) *Attorney, Agent, or Firm*—McKenna Long & Aldridge LLP

(57) ABSTRACT

A fringe field switching liquid crystal display panel capable of increasing throughput by forming a gate electrode together with a pixel electrode at the lowermost layer to reduce the deposition height of a passivation film to a thickness of a gate insulation film such that particles generated during the deposition of the passivation film may be reduced, and a method for manufacturing the fringe field switching liquid crystal display panel are disclosed. The panel includes a gate line formed on a substrate; a pixel electrode formed on the same layer as the gate line; a gate insulation film for covering the gate line and pixel electrode; a data line formed to intersect with the gate line and having the gate insulation film arranged between the data line and gate line; a passivation film formed on the gate insulation film to cover a thin film transistor; and a common electrode formed to overlap the pixel electrode with the gate insulation film and passivation film arranged between the common electrode and the pixel electrode.

14 Claims, 13 Drawing Sheets

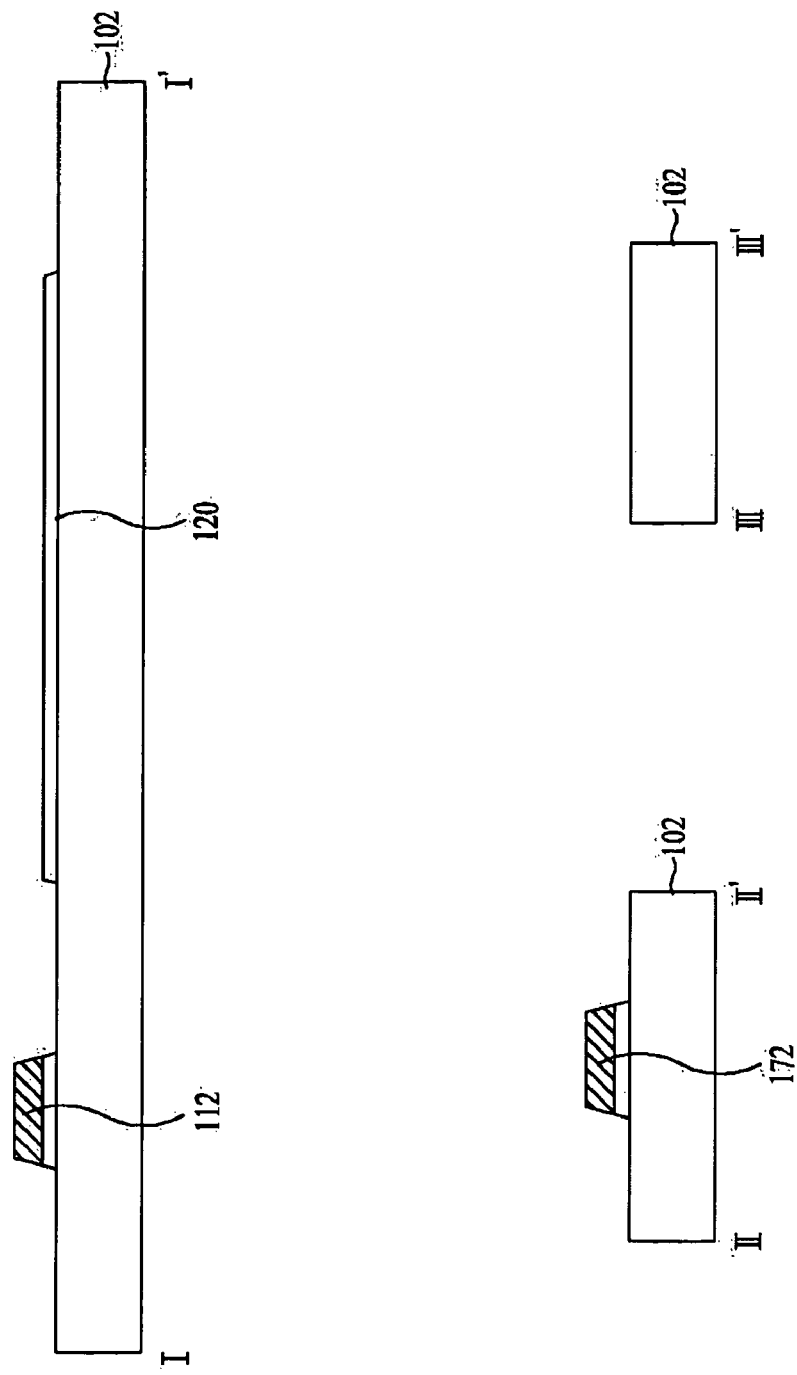

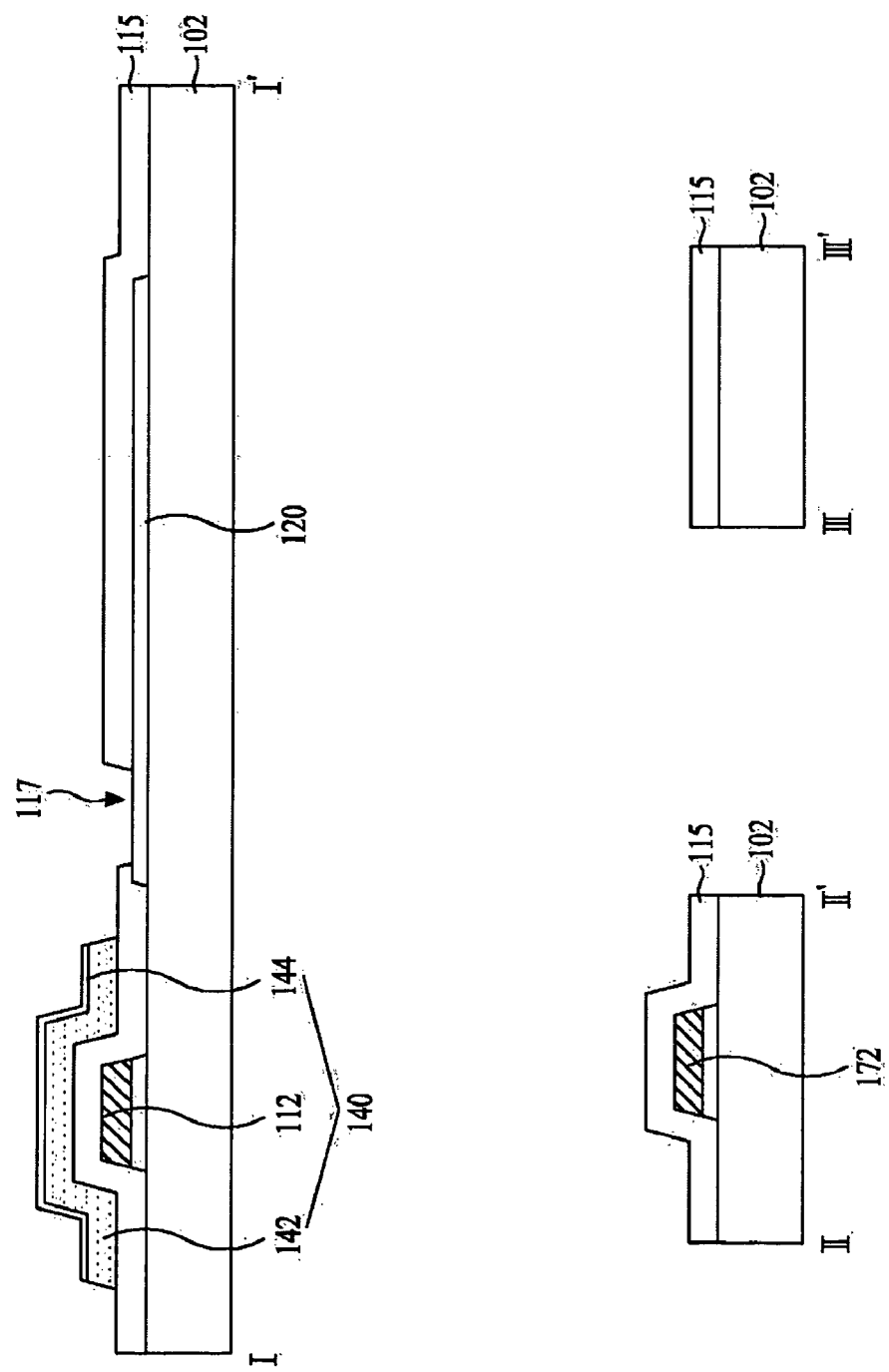

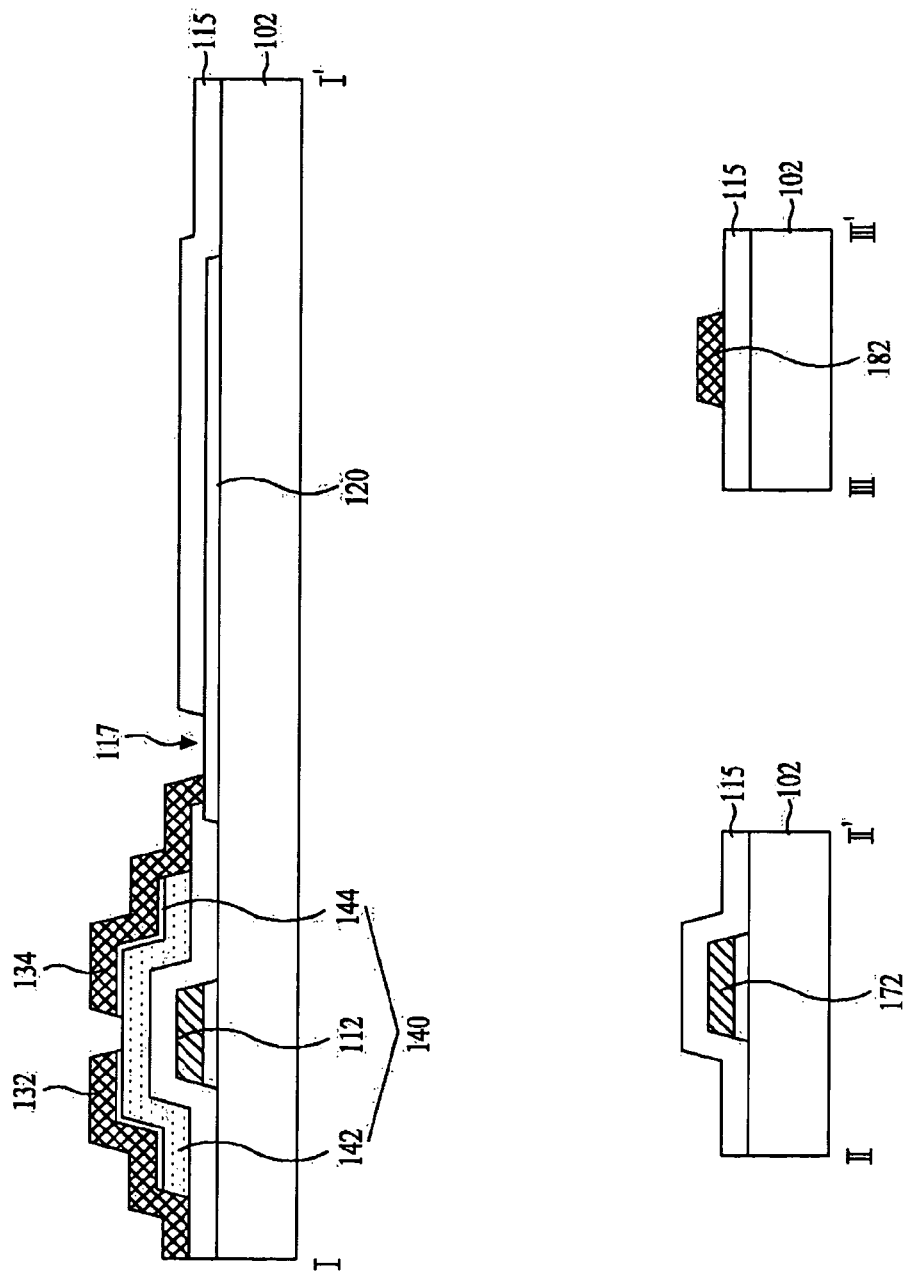

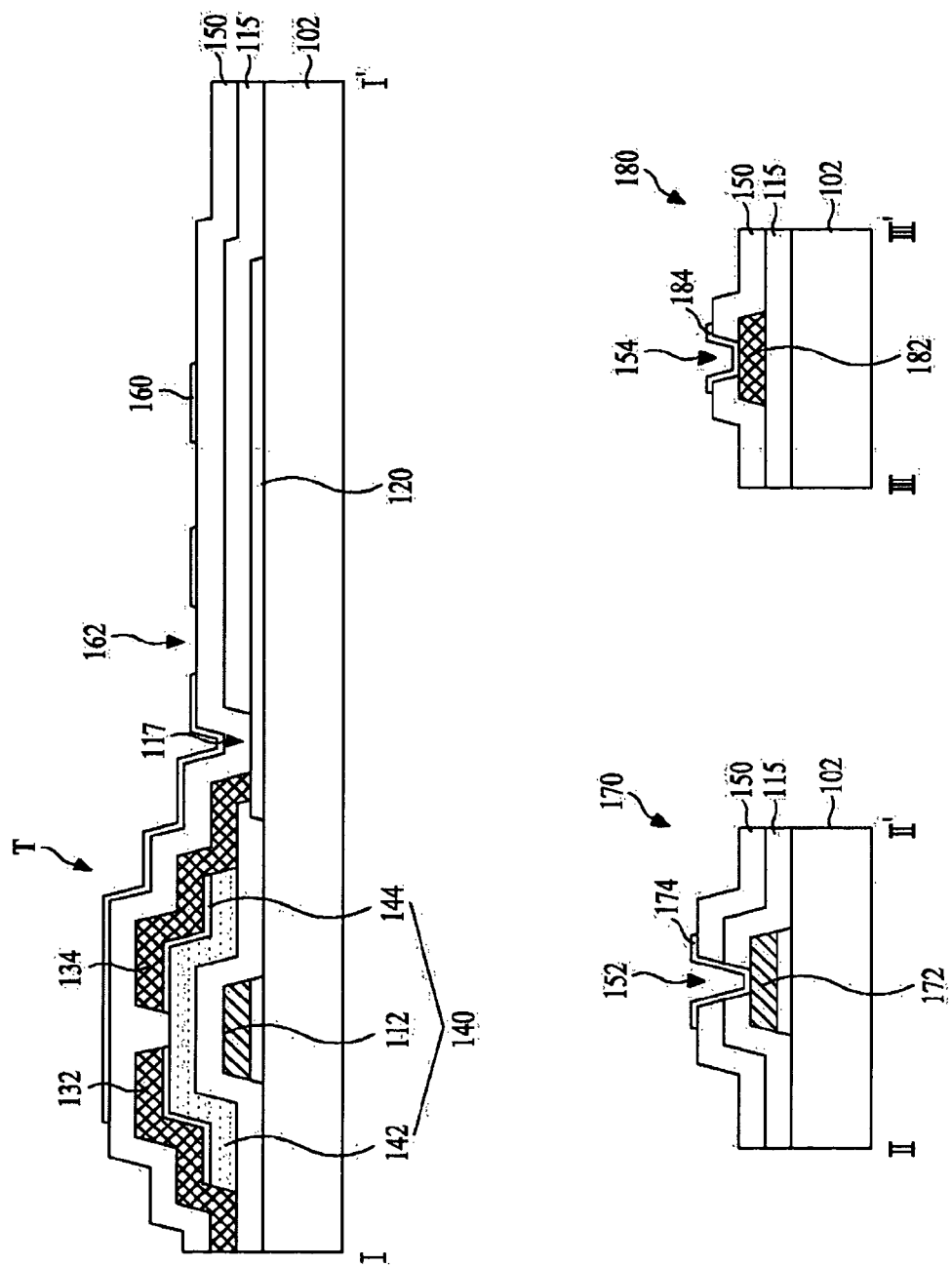

LIQUID CRYSTAL DISPLAY PANEL AND METHOD FOR MANUFACTURING THE SAME

This application claims the benefit of Korean Patent Application No. P2007-0042152, filed in Korea on Apr. 30, 2007, which is hereby incorporated by reference for all purposes as if fully set forth herein.

BACKGROUND OF THE INVENTION

1. Field of the Invention

The present invention relates to a fringe field switching liquid crystal display panel capable of increasing throughput by forming a gate electrode together with a pixel electrode at the lowermost layer to reduce the deposition height of a passivation film to a thickness of a gate insulation film such that particles generated during the deposition of the passivation film may be reduced, and to a method for manufacturing the fringe field switching liquid crystal display panel.

2. Discussion of the Related Art

A liquid crystal display panel (LCD) controls light transmittance using an electric field to thereby display a picture. Such a liquid crystal display panel is largely classified into a vertical electric field type and a horizontal electric field type based upon a direction of the electric field driving the liquid crystal.

The liquid crystal display device of a vertical electric field type drives a liquid crystal in a twisted nematic (TN) mode with a vertical electric field formed between a pixel electrode and a common electrode arranged opposite to each other on upper and lower substrates. The liquid crystal display device of a vertical electric field type has an advantage of a large aperture ratio, while having a drawback of a narrow viewing angle of about 90°.

The liquid crystal device of a horizontal electric field type drives a liquid crystal in an in-plane switching (hereinafter, referred to as 'IPS') mode with a horizontal electric field between the pixel electrode and the common electrode arranged in parallel to each other on the lower substrate. The liquid crystal display device of a horizontal electric field type has an advantage of a wide viewing angle of about 160°, while having a drawback of reduced aperture ratio and transmittance.

In order to improve upon the drawback of the liquid crystal device of a horizontal electric field type, a fringe field switching (hereinafter, referred to as 'FFS') liquid crystal display panel driven by a fringe field has been suggested.

The related art fringe field switching (FFS) liquid crystal display panel, as shown in FIG. 1, comprises a gate insulation film 15 covering a gate electrode (not shown), a pixel electrode 20 formed on the gate insulation film 15, a passivation film 50, a common electrode 60 formed at each pixel region such that it corresponds with the pixel electrode 20 with the passivation film 50 arranged between the common electrode 60 and the pixel electrode 20, and a plurality of slits 62 formed on the common electrode 60. The fringe field formed between the pixel electrode 20 and common electrode 60 drives the liquid crystal molecules positioned on the pixel region and common electrode 60 through the plurality of slits 62 to thereby display a picture.

In the case of a related art fringe field switching (FFS) liquid crystal display panel constituted as described above, as shown in FIG. 1, the passivation film 50 has to be deposited with a certain thickness, e.g., 8,000 Å or more, to offset an increase in a capacitor load generated between the pixel electrode 20 and common electrode 60 due to the pixel electrode 20 being formed on the gate insulation film 15.

That is, when depositing the passivation film 50 with a predetermined thickness by a deposition process, such as chemical vapor deposition ("CVD") inside a chamber, the time required to remove particles in the passivation film 50 generated during the deposition process inside a chamber is increased, thereby causing a problem of reducing the throughput of the liquid crystal display panel.

SUMMARY OF THE INVENTION

Accordingly, the present invention is directed to a liquid crystal display panel and a method for manufacturing the same that substantially obviates one or more problems due to limitations and disadvantages of the related art.

An object of the present invention is to provide a liquid crystal display panel capable of increasing throughput by forming a gate electrode together with a pixel electrode at the lowermost layer to reduce the deposition height of a passivation film to a thickness of a gate insulation film such that particles generated during the deposition of the passivation film may be reduced, and a method for manufacturing the liquid crystal display panel.

Additional advantages, objects, and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these objects and other advantages and in accordance with the purpose of the invention, as embodied and broadly described herein, a fringe field switching liquid crystal display panel includes a gate line formed on a substrate; a pixel electrode formed on the same layer as the gate line; a gate insulation film for covering the gate line and pixel electrode; a data line formed to intersect with the gate line and having the gate insulation film arranged between the data line and gate line; a passivation film formed on the gate insulation film to cover a thin film transistor; and a common electrode formed to overlap the pixel electrode with the gate insulation film and passivation film arranged between the common electrode and the pixel electrode.

In another aspect of the present invention, a method for manufacturing a fringe field switching liquid crystal display panel includes forming a gate line and a pixel electrode simultaneously on a substrate; forming a gate insulation film for covering the gate line and the pixel electrode; forming a data line formed to intersect with the gate line and having the gate insulation film arranged between the data line and gate line; forming a thin film transistor at the intersection region of the gate line and the data line; forming a passivation film for covering the thin film transistor on the gate insulation film; and forming a common electrode formed to overlap the pixel electrode with the gate insulation film and the passivation film arranged between the pixel electrode and the common electrode.

In yet another aspect of the present invention, a method for manufacturing a fringe field switching liquid crystal display panel includes forming a first conductive pattern consisting of a gate line, a gate electrode connecting with the gate line and a gate pad lower electrode, and a pixel electrode on a substrate; forming a gate insulation film for covering the first conductive pattern and the pixel electrode, and a semiconductor pattern for performing channel and ohmic contact at a position where the semiconductor pattern overlaps the gate electrode with the gate insulation film arranged between the gate electrode and the semiconductor pattern; forming a second conductive pattern consisting of a data line, a source electrode connecting to the data line, a drain electrode arranged facing the source electrode with a channel arranged between the drain and source electrodes, and a data pad lower electrode on the gate insulation film; forming a passivation film for covering the second conductive pattern on the gate insulation film; and forming a third conductive pattern consisting of a common electrode formed to overlap the pixel electrode with the gate insulation film and the passivation film arranged between the common and pixel electrodes, a gate pad upper electrode, and a data pad upper electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principles of the invention.

In the drawings:

FIGS. 4A and 4B are, respectively, a plan view and sectional views illustrating a fringe field switching liquid crystal display panel formed with a first conductive pattern and a pixel electrode according to the present invention;

FIGS. 5A and 5B are, respectively, a plan view and sectional views illustrating a fringe field switching liquid crystal display panel formed with a gate insulation film having a semiconductor pattern and an open hole according to the present invention;

FIGS. 6A and 6B are, respectively, a plan view and sectional views illustrating a fringe field switching liquid crystal display panel formed with a second conductive pattern according to the present invention;

FIGS. 8A and 8B are, respectively, a plan view and sectional views illustrating a fringe field switching liquid crystal display panel formed with a third conductive pattern according to the present invention.

DETAILED DESCRIPTION OF THE ILLUSTRATED EMBODIMENTS

Reference will now be made in detail to a fringe field switching liquid crystal display panel of the present invention, examples of which are illustrated in the accompanying drawings.

First, the constituents and operation of the fringe field switching liquid crystal display panel according to the present invention will be described.

Figure 2:
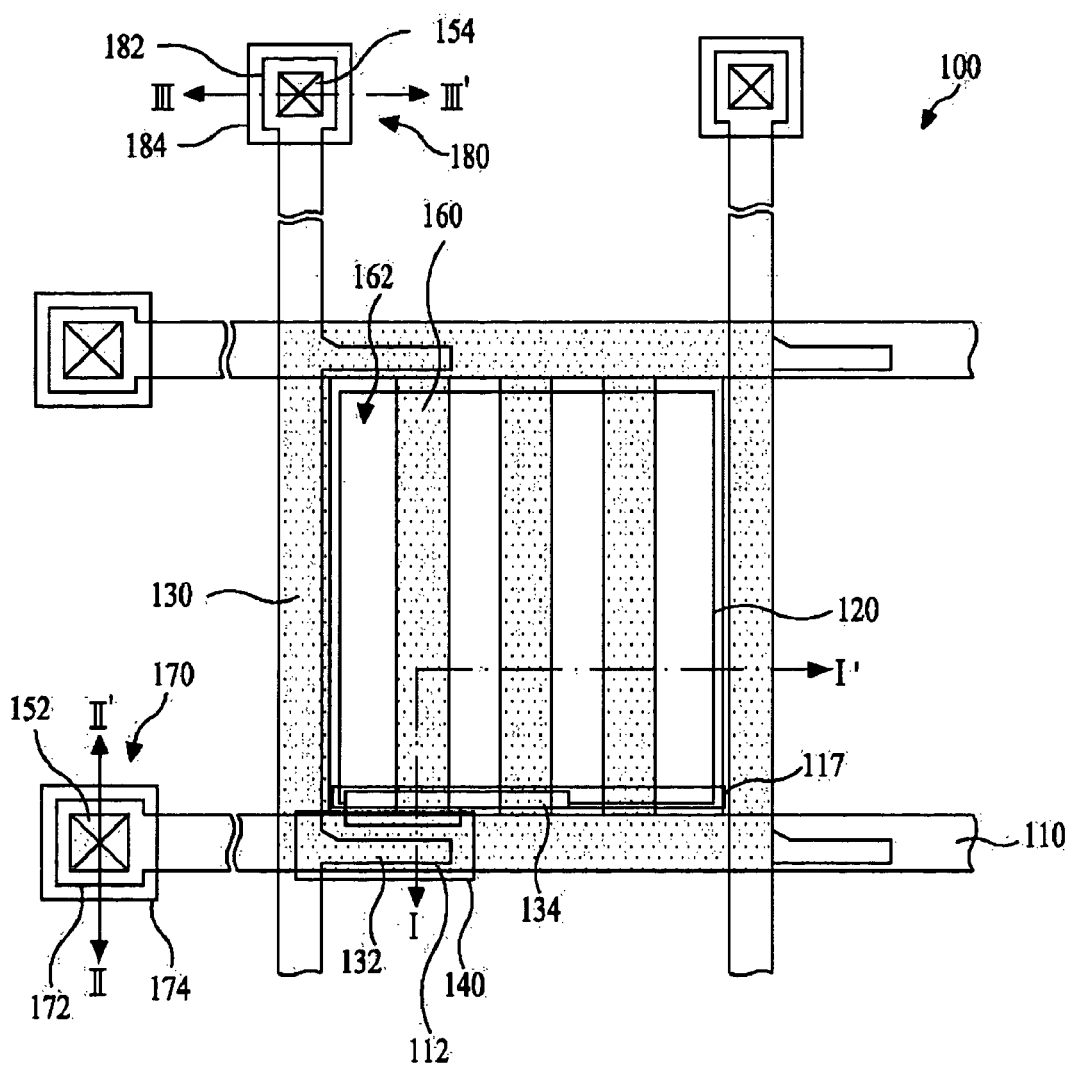
FIG. 2 is a plan view illustrating a fringe field switching (FFS) liquid crystal display panel according to the present invention.
Figure 3:
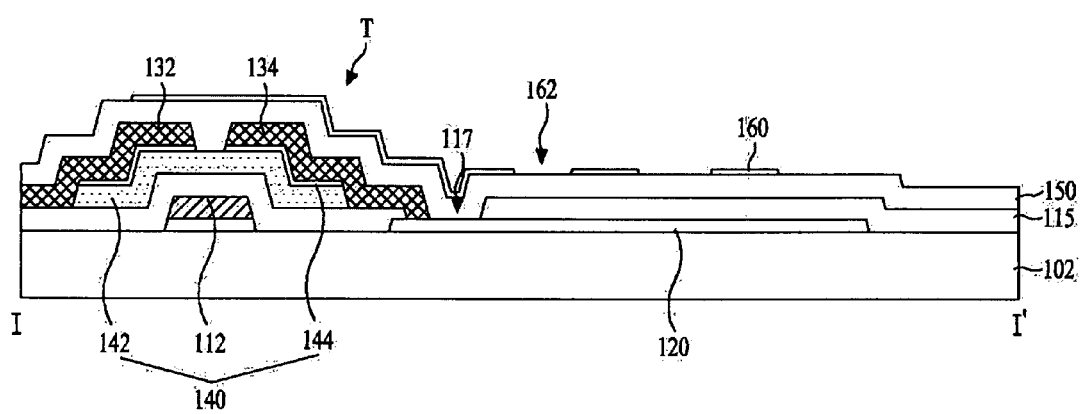
FIG. 3 illustrates sectional views illustrating a fringe field switching (FFS) liquid crystal display panel according to the present invention.
Figure 3:
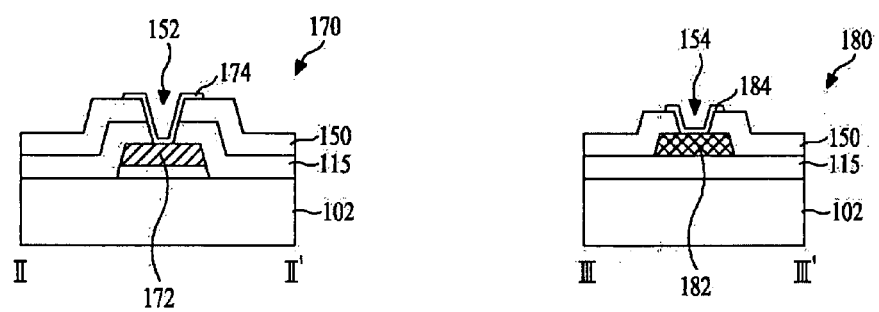

The fringe field switching liquid crystal display panel 100 according to the present invention includes, as shown in FIGS. 2 and 3, a gate line 110 formed on a substrate 102, a pixel electrode 120 formed in the same layer as the gate line 110 at a pixel region, a data line 130 formed to intersect with the gate line 110 and having a gate insulation film 115 arranged between the data line 130 and the gate line 110 to define the pixel region, a thin film transistor T formed on the intersection region of the gate line 110 and the data line 130 and connected with the pixel electrode 120 via an open hole 117 penetrating the gate insulation film 115, a passivation film 150 covering the thin film transistor T, and a common electrode 160 formed on the passivation film 150 and forming a fringe field together with the pixel electrode 120 to align a liquid crystal.

Further, the fringe field switching liquid crystal display panel 100 according to the present invention includes a gate pad 170 connected with the gate line 110, and a data pad connected with the data line 130.

The gate line 110 transfers gate signals supplied from a gate driver (now shown), which is connected to the gate pad 170, to a gate electrode 112 constituting the thin film transistor T.

Here, the gate line 110 and the gate electrode 112 consist of two layers including a transparent conductive layer (ITO) and a gate metal layer such as aluminum (Al)-based metals, copper (Cu), chromium (Cr), or molybdenum.

The pixel electrode 120 is driven by the pixel signals supplied via the thin film transistor T to form a fringe field that aligns the liquid crystal positioned on the pixel region and common electrode to a predetermined direction together with a common electrode 160.

Here, the pixel electrode 120 consists of a single layer including a transparent conductive material such as ITO. Further, the pixel electrode 120 is formed in the same layer as the gate line 110 and the gate electrode 112 at the pixel region, and at the same time, directly connected with a drain electrode 134 constituting the thin film transistor T through an open hole 117 formed on the gate insulation film 115.

The data line 130 is driven by on/off of the gate electrode 112 to serve in transferring the data signals supplied via a data driver (not shown) connected with a data pad 180 to a source electrode 132 and drain electrode 134 of the thin film transistor T.

At this time, the data line 130 intersects the gate line 110 with the gate insulation film 115 arranged between the date line 130 and the gate line 110 to define the pixel region wherein the pixel electrode 120 is positioned.

The thin film transistor T plays a role in charging the pixel signals of the data line 130 to the pixel electrode 120 in response to the gate signals of the gate line 110. Here, the thin film transistor T includes the gate electrode 112 connected with the gate line 110, the source electrode 132 connected with the data line 130, and the drain electrode 134 formed facing the source electrode 132 with a channel arranged between the drain electrode 134 and the source electrode 132.

Moreover, the thin film transistor T further includes an active layer 142 formed corresponding to the gate electrode 112 with the gate insulation film 115 arranged between the active layer 142 and the gate electrode 112, and a semiconductor pattern 140 formed on the active layer 142, consisting of an ohmic contact layer 144 for performing ohmic contact with the source electrode 132 and drain electrode 134.

Here, the drain electrode 134 constituting the thin film transistor T overlaps the pixel electrode 120 formed on the substrate 102 through the open hole 117 penetrating the gate insulation film 115.

The passivation film 150 is formed on the gate insulation film 115, which covers the thin film transistor T and pixel electrode 120, with a predetermined thickness. The passivation film 150 plays a role in protecting the active layer 142, which forms a channel, from moisture or scratch. Here, the passivation film 150 is made of an inorganic insulation material such as silicon nitride, an organic compound such as photo-acryl, and an organic insulation material such as benzocyclobutene (BCB) or perfluorocyclobutane (PFCB).

Moreover, the passivation film 150 includes first and second contact holes 152 and 154 formed by a mask process. Here, the first contact hole 152 perforates the passivation film 150 and gate insulation film 115 to open a gate pad lower electrode 172, while the second contact hole 154 perforates the passivation film 150 to expose the data pad lower electrode 182.

Here, the pixel electrode 120 is formed in the lowermost layer and is covered with the gate insulation film 115. Thus, in order to offset a capacitor load generated between the pixel electrode 120 and the common electrode 160, the passivation film 150 is deposited on the gate insulating film 115 with a thickness of about 4,000 Å.

Figure 1:
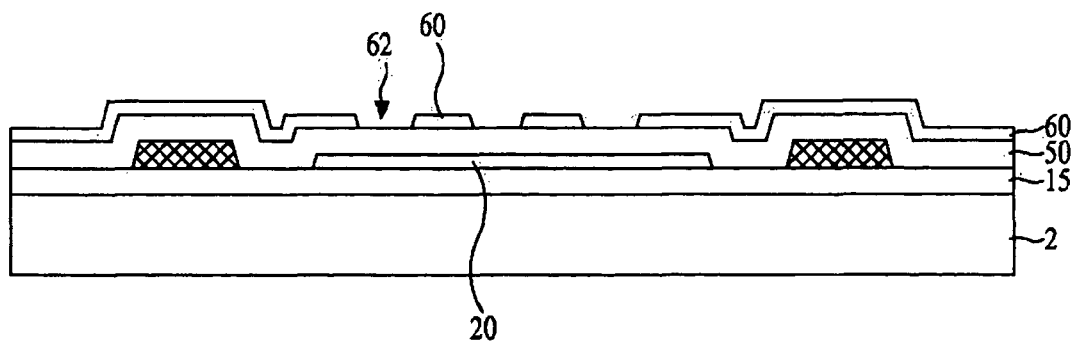
FIG. 1 is a sectional view illustrating a related art fringe field switching (FFS) liquid crystal display panel.

That is, the passivation film 50 constituting the related art liquid crystal display panel, as shown in FIG. 1, is deposited on the gate insulation film 15 with a thickness of about 8,000 Å or more to offset an increase in a capacitor load generated between the pixel electrode 20 and the common electrode 60, since the pixel electrode 20 and the common electrode 60 are superposedly formed with the passivation film 50 arranged between the pixel electrode 20 and the common electrode 60.

However, the passivation film 150 constituting the present invention is deposited on the gate insulation film 115 with a thickness of about 4,000 Å to offset an increase in a capacitor load generated between the pixel electrode 120 and the common electrode 160, since the pixel electrode 120 is formed under the gate insulation film 115 with a thickness of about 4,000 Å.

Therefore, with a decrease in particles generated during the formation of the passivation film 150 by a deposition method such as CVD inside a chamber, a cleaning process for removing the remaining particles inside the chamber is reduced, thereby increasing throughput.

The common electrode 160 may be made of a transparent conductive material such as ITO or IZO and formed on the overall surface of the pixel region by overlapping the pixel electrode 120 and having the passivation film 150 arranged between the common electrode 160 and the pixel electrode 120. At this time, the common electrode 160 is formed with a plurality of slits 162 which penetrate a fringe field that drives the aligned liquid crystal on the pixel region and common electrode 160 to a predetermined direction.

That is, when applying a common voltage through a common line (not shown), a fringe field is formed between the common electrode 160 and the pixel electrode 120. The fringe field aligns the liquid crystal molecules positioned on the pixel region and common electrode 160 to a predetermined direction through the plurality of slits 162 formed on the common electrode 160.

Moreover, the common electrode 160 is formed on the channel region of the thin film transistor T, and as a result, it also plays a role in preventing the generation of a leakage current and off-current that are flowing in the channel region.

The gate pad 170 is connected with a gate driver (not shown) to supply the gate signals to the gate line 110. Here, the gate pad 170 includes the gate pad lower electrode 172 extended from the gate line 110, and a gate pad upper electrode 174 connecting with the gate pad lower electrode 172 through the first contact hole 152 that perforates the passivation film 150 and the gate insulation film 115.

At this time, the gate pad lower electrode 172 constituting the gate pad 170 is made of the same material as the gate line 110, and the gate pad upper electrode 174 is made of the same material as the common electrode 160.

The data pad 180 is connected with a data driver (not shown) to supply the data signals to the data line 130. Here, the data pad 180 includes the data pad lower electrode 182 extended from the data line 130, and a data pad upper electrode 184 connecting with the data pad lower electrode 182 through the second contact hole 154 that perforates the passivation film 150.

At this time, the data pad lower electrode 182 constituting the data pad 180 is made of the same material as the data line 120, and the data pad upper electrode 184 is formed simultaneously with the common electrode 160 using the same material therewith.

Hereinafter, a method for manufacturing a fringe field switching liquid crystal display panel according to the present invention will be described.

Figure 4A:
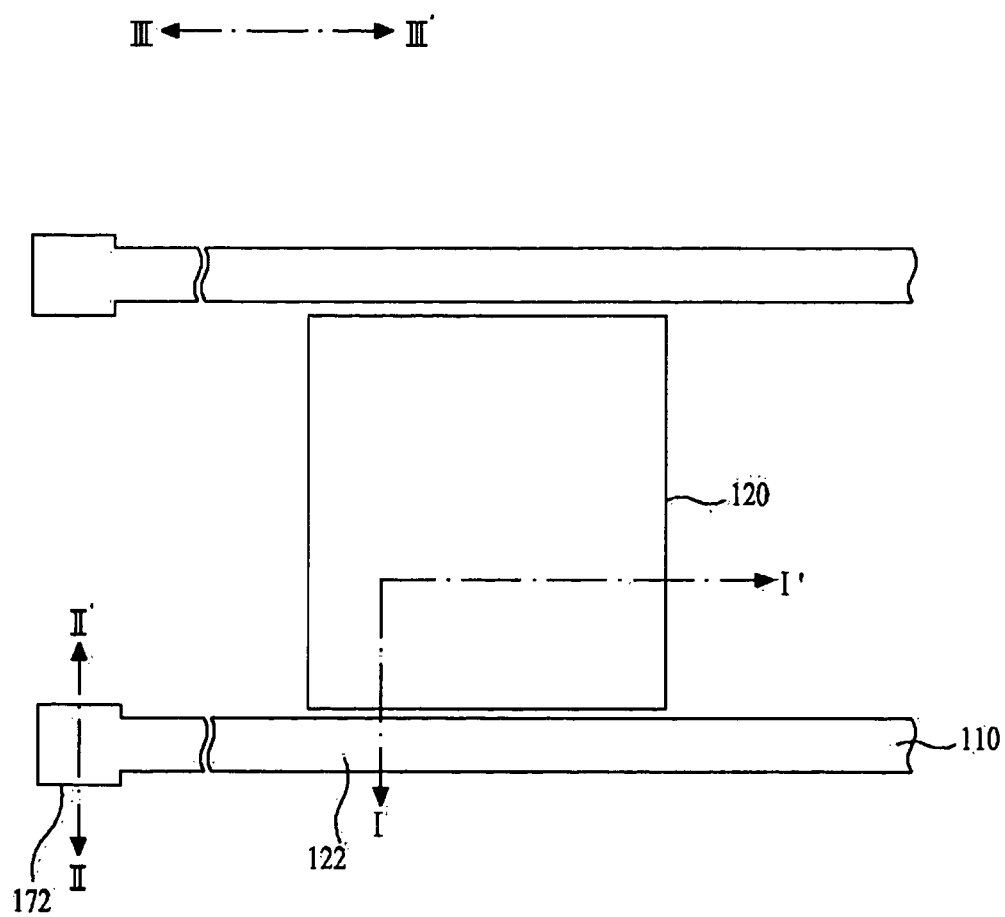

First, a first mask process according to the present invention is performed, as shown in FIGS. 4A and 4B, to form a first conductive pattern consisting of a gate line 110, a gate electrode 112 and a gate pad lower electrode 172, and a pixel electrode 120 on a substrate 102.

More particularly, a transparent conductive material (ITO) and a gate metal layer are deposited sequentially by a deposition process such as sputtering on the substrate 102. Here, the gate metal layer consists of aluminum (Al)-based metals, Copper (Cu), chromium (Cr), Molybdenum, or other suitable material.

Thereafter, a photoresist is applied entirely on the gate metal layer. Then, photolithography using the first mask is performed to form a photoresist pattern for exposing the gate metal layer.

Here, the first mask is a semi-transmissive mask having a blocking part in the region where the first conductive pattern is to be formed, a semi-transmissive part in the region where the pixel electrode is to be formed, and a transmissive part in the other regions.

After performing wet etching on the gate metal layer in the transmissive region exposed by the photoresist pattern, the photoresist pattern is subjected to ashing to expose the gate metal layer formed in the semi-transmissive region.

After forming the pixel electrode 120 made of a transparent conductive material (ITO) by wet etching the gate metal layer exposed to the semi-transmissive region, the remaining photoresist pattern is subjected to ashing to form the first conductive pattern consisting of the gate line 110, the gate electrode 112 formed integrally with the gate line 110, and the gate pad lower electrode 172 on the substrate 102.

Here, the first conductive pattern consists of two layers including a transparent conductive material (ITO) and a gate metal layer, and the pixel electrode 120 consists of a single layer made of a transparent conductive material (ITO).

Figure 5A:
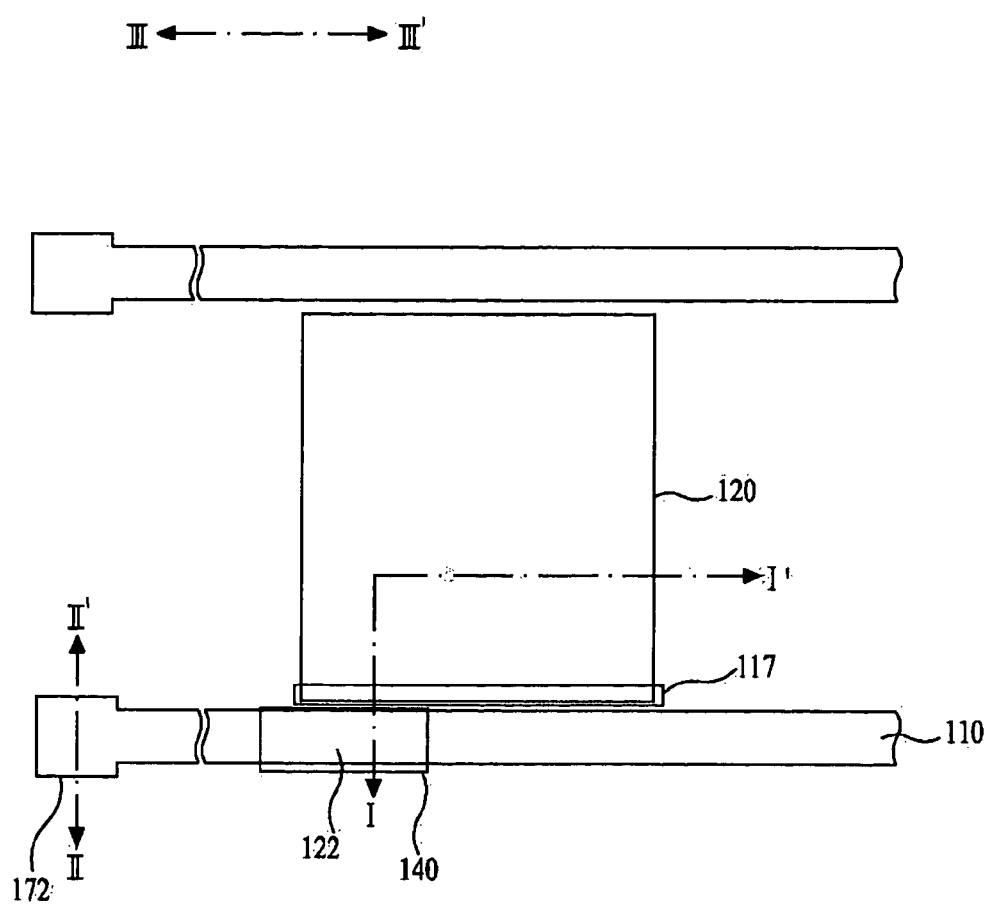

As described above, the first conductive pattern and the pixel electrode are formed simultaneously on the substrate. Then, as shown in FIGS. 5A and 5B, a gate insulation film 115 is formed by a second mask process in which an open hole 117 for exposing a semiconductor pattern 140 and pixel electrode 120 is formed.

More particularly, the gate insulation film 115 and a semiconductor layer are entirely deposited in this order on the substrate 102 formed with the first conductive pattern. Here, the semiconductor layer is made of an a-Si layer for forming a channel and an n+Si layer for an ohmic contact.

Thereafter, a photoresist is applied entirely on the semiconductor layer. Then, photolithography using the second mask is performed to form a photoresist pattern for exposing a predetermined region of the semiconductor layer.

Here, the second mask is a semi-transmissive mask having a blocking part in the region where the thin film transistor T is to be formed, and a transmissive part in the region where the open hole 117 is to be formed, and a semi-transmissive part in the other regions.

The n+Si layer in the open hole region exposed by the photoresist pattern is wet etched to expose the a-Si layer formed in the open hole region.

Thereafter, the photoresist pattern is subjected to ashing to expose the a-Si layer in the open hole region and the n+Si layer formed in the region other than the region where the thin film transistor T is to be formed.

At this time, the a-Si layer in the exposed open hole region by the ashed photoresist pattern is wet etched to expose the gate insulation film 115, and at the same time remove n+Si layer formed in the region other than the region where the thin film transistor T is to be formed to expose the a-Si layer.

Thereafter, the gate insulation film 115 exposed in the open hole region and the a-Si layer formed in the region other than the region where the thin film transistor T is to be formed simultaneously. As a result, a semiconductor pattern 140 for forming a channel of the thin film transistor and the open hole 117 for exposing the pixel electrode 120 formed on the substrate 102 through the gate insulation film 115 are formed.

Here, the semiconductor pattern 140 consists of an active layer 142 for forming a channel of the thin film transistor T and an ohmic contact layer 144 for ohmic contact. And, the gate insulation film 115 is deposited with a height of about 4,000 Å.

Figure 6A:
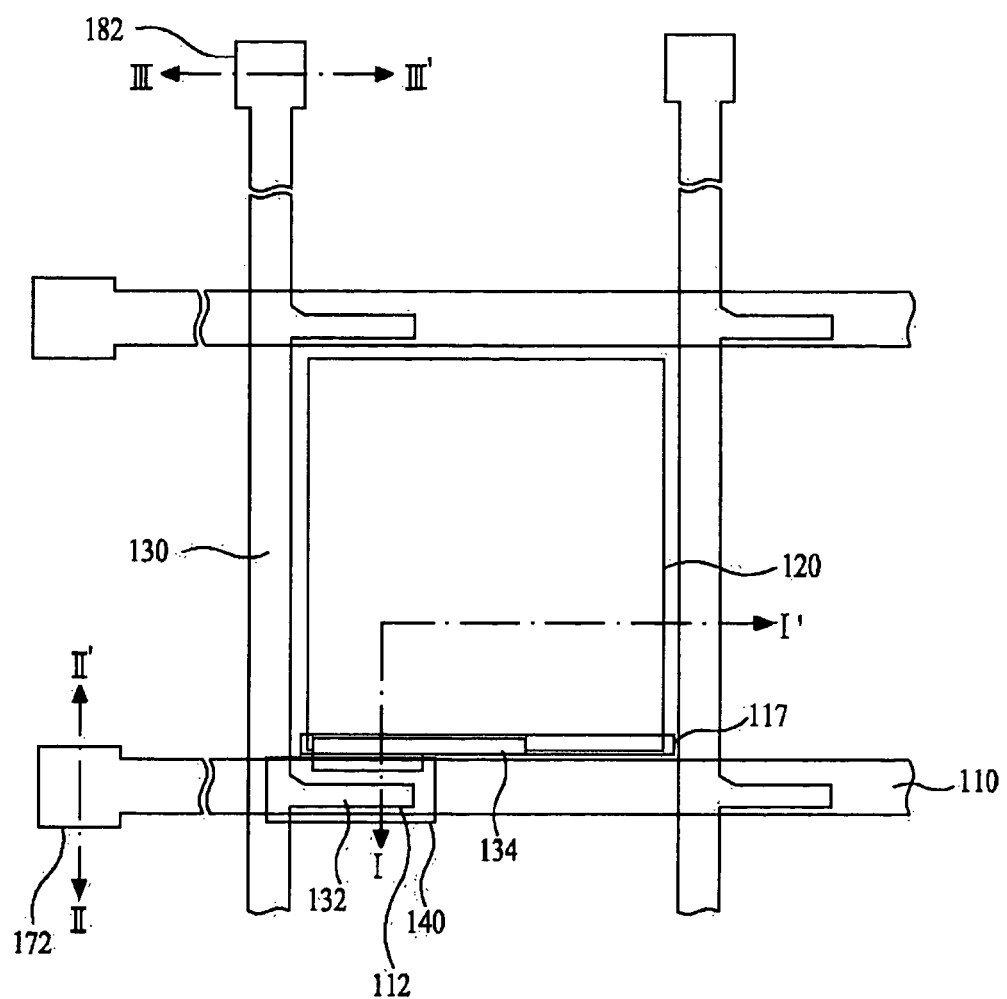

As described above, the semiconductor pattern 140 and the open hole 117 are formed. Then, as shown in FIGS. 6A and 6B, a second conductive pattern consisting of a data line 130, a source electrode 132, a drain electrode 134 and a data pad low electrode 182 are formed by a third mask process according to the present invention.

More particularly, on the gate insulation film 115 formed with the semiconductor pattern 140, a data metal layer is deposited sequentially.

After applying a photoresist entirely on the data metal layer, photolithography using the third mask is performed, thereby forming a photoresist pattern for exposing the data metal layer. Here, the third mask has a blocking part in a region where a second conductive pattern is to be formed and a transmissive part in a channel region and the other regions within the data metal layer.

A data metal layer 120a exposed by the photoresist pattern is etched for removal such that the data metal layer formed on the channel region of the thin film transistor T is separated out.

Thereafter, the ohmic contact layer exposed at the channel region with the separation of the data metal layer is removed by dry etching such that the active layer 142 for forming the channel is exposed.

After exposing the active layer 142 as described above, the remaining photoresist pattern on the data metal layer is subjected to ashing. As a result, the second conductive pattern consisting of the data line 130 for defining the pixel region by the intersection with the gate line 110 and having the gate insulation film 115 arranged between the gate line 110 and the data line 130, the source electrode 132 connecting with the data line 130, the drain electrode 134 facing the source electrode 132 with the channel arranged between the source electrode 132 and the drain electrode 134, and the data pad lower electrode 182 are formed.

Here, the drain electrode 134 of the thin film transistor T overlaps the pixel electrode 120 through the open hole 117 that perforates the gate insulation film 115. Thereby, an aperture ratio is remarkably increased compared with the related art thin film transistor T having a projected structure by the pixel region.

Figure 7A:
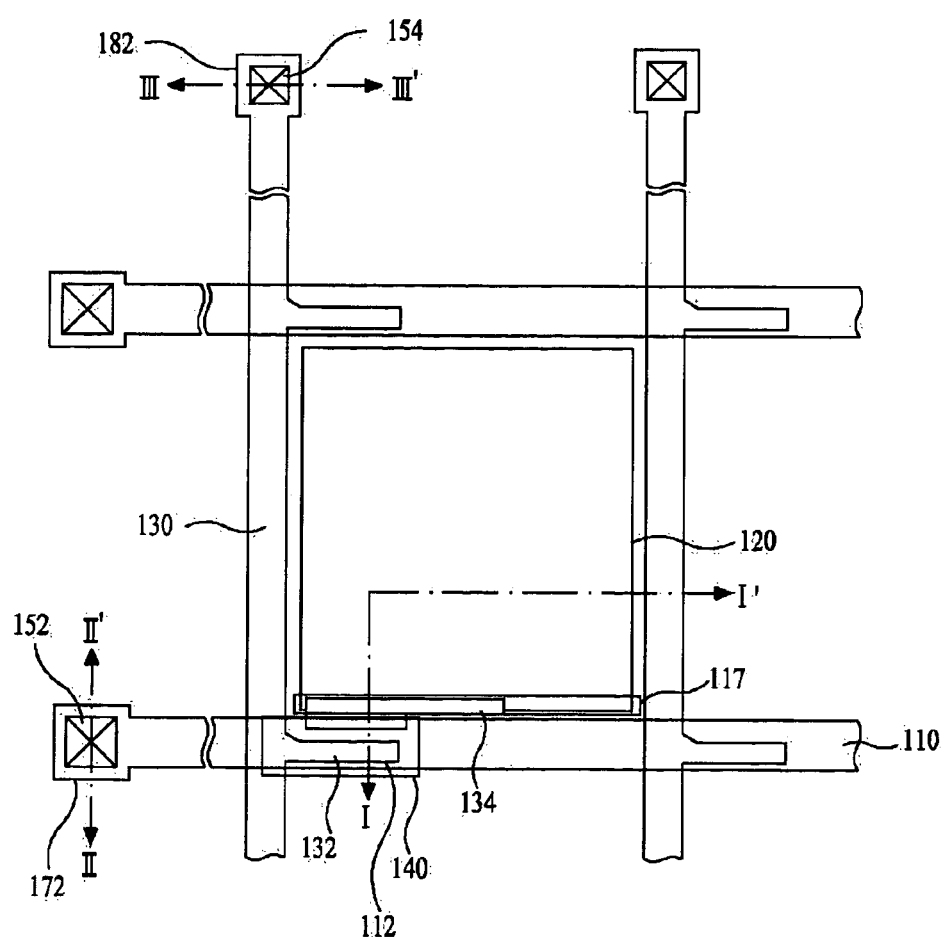
FIGS. 7A and 7B are, respectively, a plan view and sectional views illustrating a fringe field switching liquid crystal display panel formed with a passivation film having a contact hole according to the present invention.
Figure 7B:
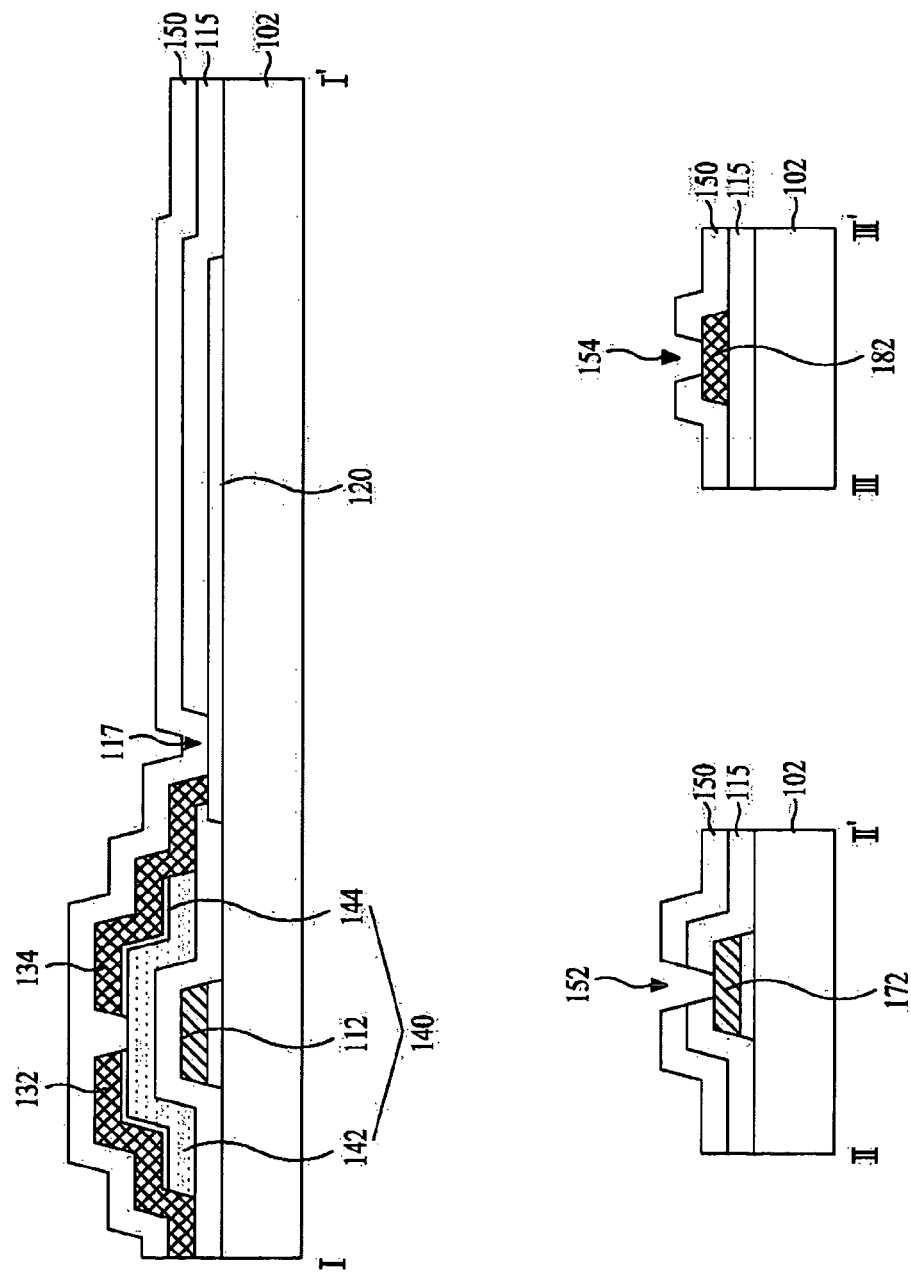

As described above, the second conductive pattern is formed on the gate insulation film. Then, as shown in FIGS. 7A and 7B, a passivation film 150 having contact holes 152 and 154 is formed by a fourth mask process.

More particularly, the passivation film 150 is deposited entirely on the gate insulation film 115 formed with the second conductive pattern by a deposition process such as CVD. Here, the passivation film 150 is made of an inorganic insulation material such as silicon nitride, an organic compound such as photo-acryl, and an organic insulation material such as benzocyclobutene (BCB) or perfluorocyclobutane (PFCB).

Thereafter, a photoresist is applied entirely on the passivation film 150. Then, photolithography using the fourth mask is performed to form a photoresist pattern for exposing the passivation film 150.

At this time, the passivation film 150 exposed by the photoresist pattern is etched to form a first contact hole 152 for exposing the gate pad lower electrode 172 through the passivation film 150 and gate insulation film 115, and a second contact hole 153 for exposing the data pad lower electrode 182 through the passivation film 150.

At this time, the passivation film 150 deposited on the gate insulation film 115 by a deposition process such as CVD has the pixel electrode 120 formed in the lowermost layer with the gate insulation film 115 covering the pixel electrode 120. Thus, the passivation film 150 is deposited on the gate insulation film 115 with a predetermined thickness, and more particularly a thickness of about 4,000 Å to offset a capacitor load generated between the pixel electrode 120 and the common electrode 160.

That is, the passivation film constituting the related art liquid crystal display panel is deposited with a thickness of about 8,000 Å or more to offset a capacitor load generated between the pixel electrode and the common electrode, since has the pixel electrode and the common electrode are superposedly formed with the passivation film arranged between the pixel electrode and the common electrode. However, the passivation film 150 constituting the present invention is formed on the gate insulation film 115 with a thickness of about 4,000 Å, since the pixel electrode 120 and the common electrode 160 are superposedly formed with the gate insulation film 115 and the passivation film 150 arranged between the pixel electrode 120 and the common electrode 160 with a thickness of about 4,000 Å. Herein, the total thickness of the gate insulation film and the passivation film is about 8,000 Å or more. It is preferably that the gate insulation film and the passivation film are formed with a thickness of about 3,500~4,500 Å.

Therefore, throughput is increased with a decrease in particles generated during the formation of the passivation film 150 by a deposition method such as CVD inside a chamber.

Figure 8A:
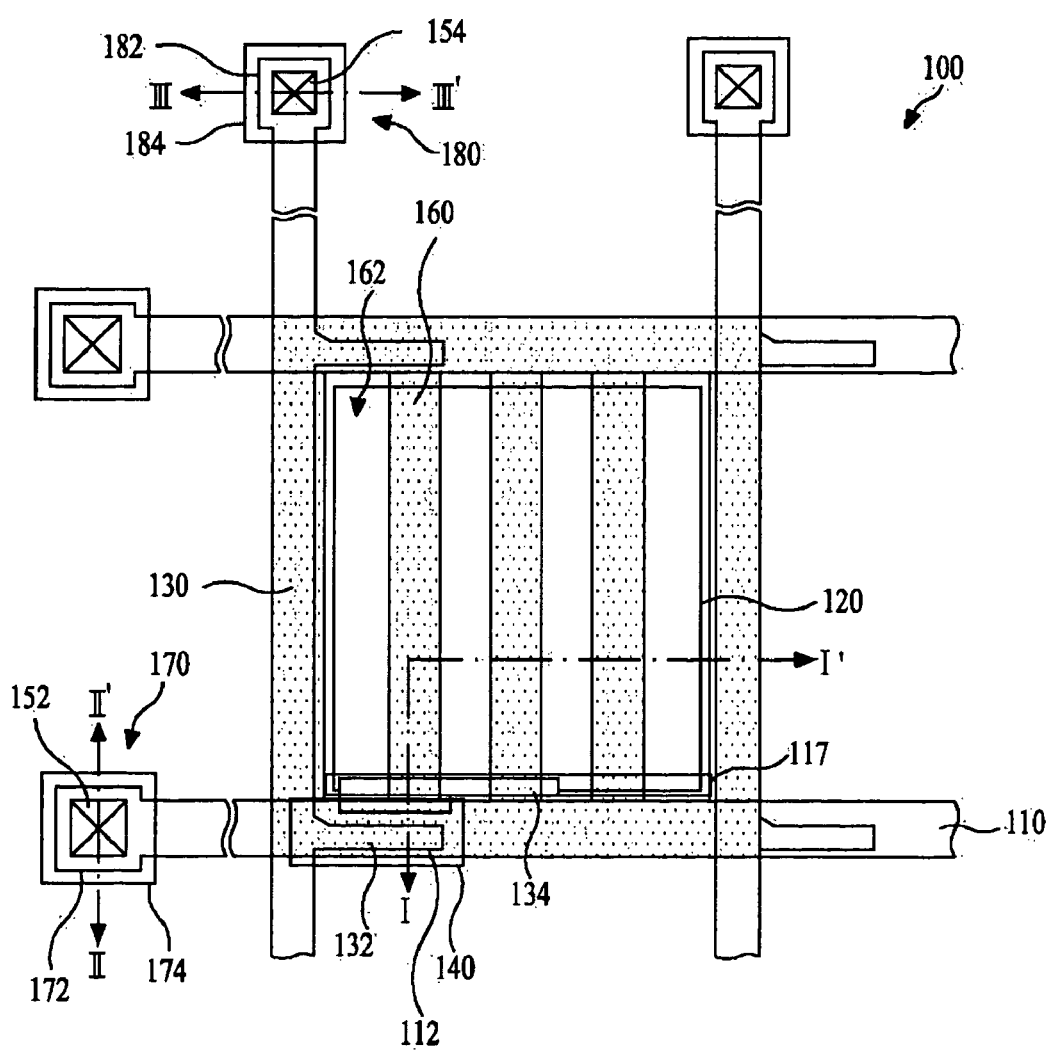

As described above, the passivation film having a predetermined height is formed. Then, as shown in FIGS. 8A and 8B, the third conductive pattern consisting of the common electrode 160 for forming a fringe field, the gate pad upper electrode 174 and the data pad upper electrode 184 are formed by a fifth mask process according to the present invention.

More particularly, a transparent conductive layer (ITO) is deposited entirely on the passivation film 150 formed with the contact holes 152 and 154 by a deposition process such as Plasma Enhanced Chemical Vapor Deposition ("PECVD").

Thereafter, a photoresist is applied entirely on the transparent conductive layer. Then, photolithography using the fifth mask is performed to form a photoresist pattern for exposing the transparent conductive layer ITO.

The transparent conductive layer (ITO) exposed by the photoresist pattern is etched followed by removing the remaining photoresist pattern. As a result, the third conductive pattern consisting of the common electrode 160 for forming a fringe field, the gate pad upper electrode 174 connecting with the gate pad lower electrode 172 through the first contact hole and the data pad upper electrode 184 connecting with the data pad lower electrode 182 through the second contact hole 154 are formed.

Here, the common electrode 160 and the pixel electrode 120 are superposedly formed with the passivation film 150 and the gate insulation film 115 arranged between the common electrode 160 and the pixel electrode 120. The common electrode 160 is formed with a plurality of slits 162 where the fringe field aligns the liquid crystal positioned on the pixel region and common electrode to a predetermined direction together with the pixel electrode 120.

Moreover, the gate pad upper electrode 174 constituting the gate pad 170 is made of the same material as the common electrode 160 and formed simultaneously therewith, while the data pad upper electrode 184 constituting the data pad 180 is made of the same material as the common electrode 160 and formed simultaneously therewith.

As described above, the present invention forms the gate electrode together with the pixel electrode at the lowermost layer to reduce a deposition height of the passivation film to a thickness of the gate insulation film. Thus, an effect capable of increasing throughput by reducing the particle generation during the passivation deposition is provided.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A fringe field switching liquid crystal display panel comprising:

a first conductive pattern consisting of a gate line formed on a substrate, a gate electrode connecting with the gate line and a gate pad lower electrode;

a pixel electrode formed on the same layer as the gate line;

a gate insulation film for covering the first conductive pattern and pixel electrode;

a second conductive pattern consisting of a data line formed to intersect the gate line with the gate insulation film arranged between the data line and gate line, a source electrode connecting to the data line, a drain electrode arranged facing the source electrode with a channel arranged between the drain and source electrodes, and a data pad lower electrode on the gate insulation film;

a passivation film formed on the gate insulation film to cover the second conductive pattern; and a third conductive pattern consisting of a common electrode formed to overlap the pixel electrode with the gate insulation film and passivation film arranged between the common electrode and the pixel electrode, a gate pad upper electrode, and a data pad upper electrode.

2. The panel according to claim 1, wherein the gate line consists of two layers including a transparent conductive layer and a gate metal layer, and the pixel electrode consists of a single layer including a transparent conductive layer.

3. The panel according to claim 2, wherein the gate insulation film and passivation film are formed with a height of about 4,000 Å.

4. The panel according to claim 1, wherein the gate insulation film is formed with an open hole for exposing the pixel electrode.

5. The panel according to claim 4, wherein the drain electrode is superposedly connected with the pixel electrode through the open hole penetrating the gate insulation film.

6. The panel according to claim 1,
wherein the gate electrode consists of two layers including a transparent conductive layer and a gate metal layer.

7. A method for manufacturing a fringe field switching liquid crystal display panel comprising:

forming a first conductive pattern consisting of a gate line, a gate electrode connecting with the gate line and a gate pad lower electrode, and a pixel electrode on a substrate;

forming a gate insulation film covering the first conductive pattern and the pixel electrode, and a semiconductor pattern for performing channel and ohmic contact at a position where the semiconductor pattern overlaps the gate electrode with the gate insulation film arranged between the gate electrode and the semiconductor pattern;

forming a second conductive pattern consisting of a data line, a source electrode connecting to the data line, a drain electrode arranged facing the source electrode with a channel arranged between the drain and source electrodes, and a data pad lower electrode on the gate insulation film;

forming a passivation film for covering the second conductive pattern on the gate insulation film; and forming a third conductive pattern consisting of a common electrode formed to overlap the pixel electrode with the gate insulation film and the passivation film arranged between the common and pixel electrodes, a gate pad upper electrode, and a data pad upper electrode.

8. The method according to claim 7, wherein the step for forming the first conductive pattern and the pixel electrode comprises:

forming a transparent conductive layer entirely on the substrate;

forming a gate metal layer entirely on the transparent conductive layer;

applying a photoresist entirely on the gate metal layer and forming a photoresist pattern having a blocking part in regions where the first conductive pattern and the pixel electrode are to be formed;

etching the gate metal layer in the pixel region exposed by the photoresist pattern to form the pixel electrode; and ashing the remaining photoresist pattern on the gate metal layer to form the first conductive pattern.

9. The method according to claim 8, wherein the pixel electrode consists of a single layer including a transparent conductive layer, and the first conductive pattern consists of two layers including a transparent conductive layer and a gate metal layer.

10. The method according to claim 7, wherein the step for forming the gate insulation film and the semiconductor pattern comprises:
- forming a gate insulation film for covering the first conductive pattern and the pixel electrode, and at the same time having an open hole for exposing the pixel electrode;
- forming a semiconductor layer for forming a channel on the gate insulation film;
- applying a photoresist entirely on the semiconductor layer and forming a photoresist pattern having a blocking part in regions of the semiconductor layer and the open hole;
- etching the gate insulation film exposed by the photoresist pattern to form the open hole for exposing the pixel electrode; and
- ashing the photoresist pattern to form the semiconductor pattern consisting of an active layer for forming the channel and an ohmic contact layer for ohmic contact.

11. The method according to claim 10, wherein the step of forming the second conductive pattern comprises:
- forming a data metal layer entirely on the gate insulation film formed with the open hole;
- applying a photoresist entirely on the data metal layer and forming a photoresist pattern for exposing the regions other than the region where the second conductive pattern is to be formed within the data metal layer; and
- etching the data metal layer exposed by the photoresist pattern to form the second conductive pattern.

12. The method according to claim 7, wherein the gate insulation film and the passivation film are formed with a height of about 4,000 Å by a predetermined deposition process.

13. The method according to claim 7, wherein the step for forming the passivation film comprises:
- forming a passivation film for covering the second conductive pattern on the gate insulation film;
- applying a photoresist entirely on the passivation film and forming a photoresist pattern for opening the regions where a contact hole for exposing the gate pad lower electrode and the data pad lower electrode is to be formed within the passivation film; and
- etching the passivation film exposed by the photoresist pattern and forming the open hole.

14. The method according to claim 7, wherein the step for forming the third conductive layer comprises:
- forming a transparent conductive layer entirely on the passivation film;
- applying a photoresist entirely on the transparent conductive layer and forming a photoresist pattern for opening the regions other than the region where the third conductive layer is to be formed within the transparent conductive layer; and
- etching the transparent conductive layer exposed by the photoresist pattern to form the third conductive layer.

* * * * *